United States Patent
Fabbri

(10) Patent No.: US 7,905,464 B2
(45) Date of Patent: Mar. 15, 2011

(54) LONGITUDINALLY ADJUSTABLE INTERMEDIATE PIECE WITH A UNIDIRECTIONALLY ACTING DISPLACEMENT BLOCKING MECHANISM

(76) Inventor: Flaviano Fabbri, Pianoro (IT)

( * ) Notice: Subject to any disclaimer, the term of this patent is extended or adjusted under 35 U.S.C. 154(b) by 227 days.

(21) Appl. No.: 11/883,877

(22) PCT Filed: Jan. 12, 2006

(86) PCT No.: PCT/EP2006/000238
§ 371 (c)(1),
(2), (4) Date: Aug. 8, 2007

(87) PCT Pub. No.: WO2006/084538
PCT Pub. Date: Aug. 17, 2006

(65) Prior Publication Data
US 2009/0121110 A1    May 14, 2009

(30) Foreign Application Priority Data
Feb. 10, 2005  (DE) .......................... 10 2005 006 050

(51) Int. Cl.
*F16M 13/00* (2006.01)
(52) U.S. Cl. .......................... 248/622; 248/415; 248/578
(58) Field of Classification Search ............. 403/109.1, 403/377, 109.4, 109.8, FOR. 100; 248/161, 248/405, 406.1, 406.2, 414, 415, 418
See application file for complete search history.

(56) References Cited

U.S. PATENT DOCUMENTS

| | | | |
|---|---|---|---|
| 2,872,223 A | * | 2/1959 | Shearman et al. ............ 403/104 |
| 3,687,488 A | | 8/1972 | Tabor |
| 3,778,014 A | * | 12/1973 | Driscoll et al. ............ 248/406.1 |
| 3,991,964 A | | 11/1976 | Christopher |
| 6,079,690 A | * | 6/2000 | Yoon ............................ 248/622 |

FOREIGN PATENT DOCUMENTS

| | | |
|---|---|---|
| DE | 2120588 | 11/1972 |
| DE | 2206351 | 8/1973 |
| DE | 39 41 540 | 6/1991 |
| DE | 41 12 641 | 10/1992 |
| DE | 43 22 540 | 1/1994 |

OTHER PUBLICATIONS

International Search Report mailed Jun. 12, 2006.

* cited by examiner

*Primary Examiner* — Amy J Sterling
(74) *Attorney, Agent, or Firm* — Nixon & Vanderhye P.C.

(57) ABSTRACT

The invention relates to a longitudinally adjustable intermediate piece with a first and second longitudinal element. A spindle nut is placed inside the second longitudinal element and rests via one of its two faces on a friction surface of the second longitudinal element while covering a large area or can be brought into contact therewith. However, a friction-reducing axial bearing is provided between the other face of the spindle nut and the second longitudinal element so that the spindle nut can be set in rotation over the thread when applying an axial tractive force to the longitudinal elements and the longitudinal elements can be continuously pulled out of one another. However, the rotation of the spindle nut is blocked when applying an axial compressive force to the longitudinal elements by means of the frictional resistance between the spindle nut and the friction surface thereby preventing the longitudinal elements from being pushed together. In addition, a longitudinally adjustable intermediate piece is created in which the unidirectionally acting displacement blocking mechanism acts in the opposite direction, i.e. in the pull-out direction.

14 Claims, 2 Drawing Sheets

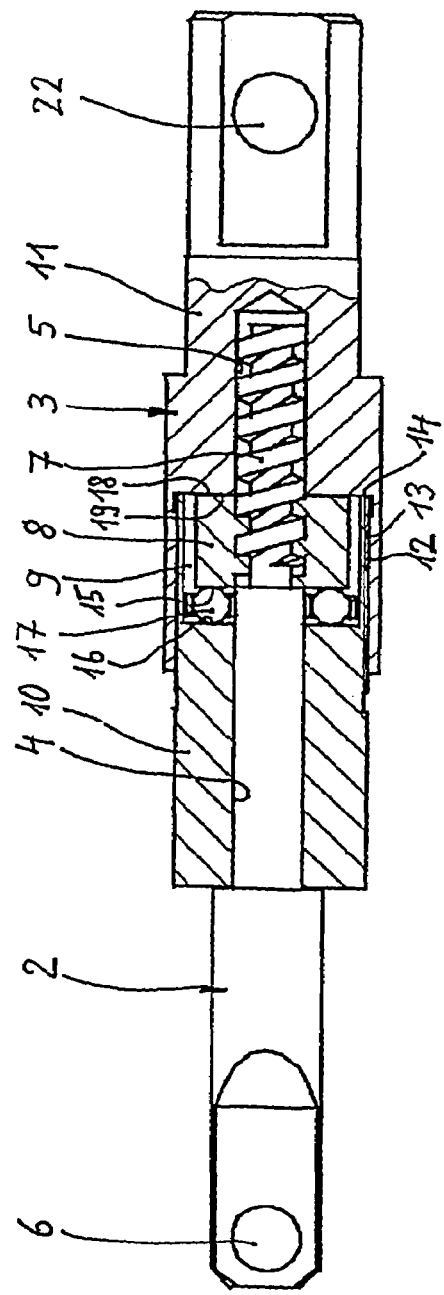
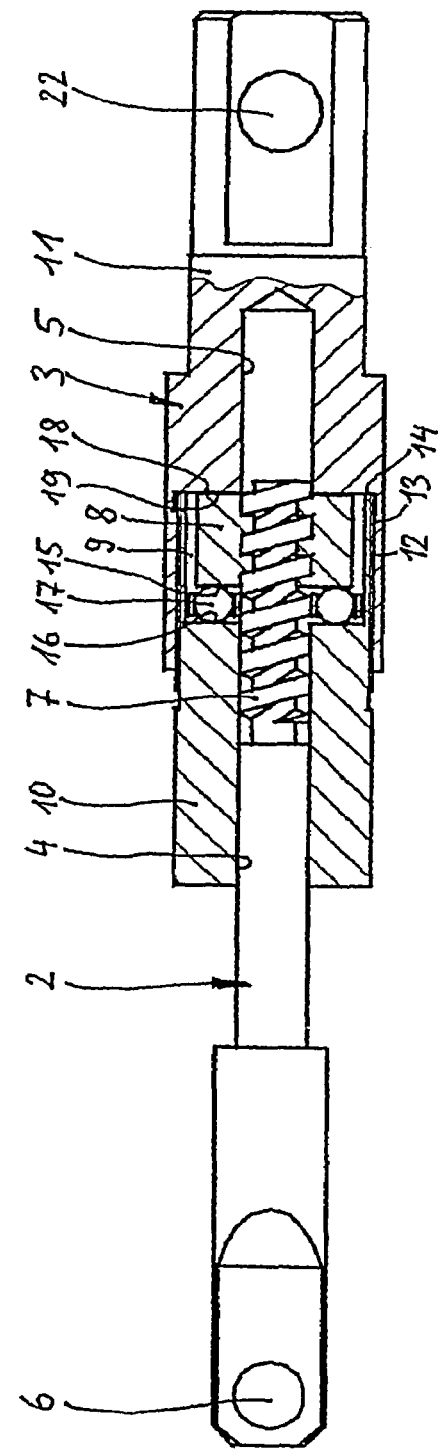
Fig. 1
Fig. 2

LONGITUDINALLY ADJUSTABLE INTERMEDIATE PIECE WITH A UNIDIRECTIONALLY ACTING DISPLACEMENT BLOCKING MECHANISM

This application is the U.S. national phase of International Application No. PCT/EP2006/000238 filed 12 Jan. 2006 which designated the U.S. and claims priority to DE 10 2005 006 050.1 filed 10 Feb. 2005, the entire contents of each of which are hereby incorporated by reference.

BACKGROUND OF THE INVENTION

The invention relates to a longitudinally adjustable intermediate piece with a unidirectionally acting displacement blocking mechanism.

Longitudinally adjustable intermediate pieces of this kind are used in the most widely differing sectors of technology, and can be put to use in any situation in which the distance interval between two points must be set or readjusted. For example, such intermediate pieces are used as spacer pieces between elements of which the mutual distance interval changes as a result of wear, expansion, shortening, temperature changes, etc., wherein it is desired that the spacer pieces adapt to the change in the distance interval.

Unidirectionally working displacement blocking mechanisms are known which make mutual displacement of two elements only possible in one direction, while displacement in the other direction is blocked. Such mechanisms do not, however, allow for any stepless longitudinal setting or readjustment.

SUMMARY OF THE INVENTION

The invention is based on the object of providing a longitudinally adjustable intermediate piece with a unidirectionally acting displacement blocking mechanism, which can be manufactured in the simplest and most economical manner possible and allows for stepless longitudinal adjustment.

The longitudinally adjustable intermediate piece according to a first aspect has a first longitudinal element, provided with a thread, and a second longitudinal element which interacts with the first longitudinal element in a longitudinally displaceable manner. Retained in the second longitudinal element is a spindle nut in a rotatable and axially nondisplaceable manner, which interacts with the thread of the first longitudinal element. The spindle nut rests via one of its two faces on a friction surface of the second longitudinal element while covering a large area or can be brought into contact therewith if an axial compressive force takes effect on the longitudinal elements. By contrast, provided between the other face of the spindle nut and the second longitudinal element is a friction-reducing axial bearing, so that, when an axial tractive force is applied to the longitudinal elements, the spindle nut can be displaced by rotation via the thread and the longitudinal elements can be pulled apart. By contrast, on application of an axial compressive force onto the longitudinal elements, the rotation of the spindle nut is blocked by the friction resistance between the spindle nut and the friction surface, thereby preventing the longitudinal elements from being pushed together.

The longitudinally adjustable intermediate piece according to another aspect works in the reverse direction and has a first longitudinal element, provided with a thread, and a second longitudinal element which interacts with the first longitudinal element in a longitudinally displaceable manner. Retained in the second longitudinal element is a spindle nut in a rotatable and axially nondisplaceable manner, which interacts with the thread of the first longitudinal element. The spindle nut rests via one of its two faces on a friction surface of the second longitudinal element while covering a large area or can be brought into contact therewith if an axial tractive force takes effect on the longitudinal elements. By contrast, provided between the other face of the spindle nut and the second longitudinal element is a friction-reducing axial bearing so that, when an axial compressive force is applied to the longitudinal elements, the spindle nut can be displaced by rotation via the thread and the longitudinal elements can be pushed together. By contrast, on application of an axial tractive force to the longitudinal elements, the rotation of the spindle nut is blocked by the friction resistance between the spindle nut and the friction surface, thereby preventing the longitudinal elements from being pulled apart.

The intermediate piece according to the invention can be put to use in the most widely varying areas of technology, can be manufactured simply and economically and allows for a stepless longitudinal setting or adjustment. A further advantage lies in the fact that the intermediate piece is encapsulated in a simple manner and can therefore be used in very dirty surroundings.

According to an advantageous embodiment of the invention, the friction surface of the second longitudinal element and/or the face of the spindle nut adjacent to this friction surface are provided with a friction-increasing surface. As a result of this, when the intermediate piece is subjected to force in a direction in which no opposed displacement of the longitudinal elements is supposed to take place, the rotation of the spindle nut is also blocked in a very simple and effective manner if the thread has a somewhat greater pitch.

Advantageously, the second longitudinal element is divided into two parts and consists of a front section and a rear section, which can be secured to be axially flush with one another, wherein the friction surface is formed in the rear section, while the axial bearing is arranged between the spindle nut and the front section. As an alternative to this, the friction surface can be formed in the front section, while the axial bearing is arranged between the spindle nut and the rear section. Such a division into two parts allows for particularly simple manufacture as well as installation or removal of the intermediate piece.

The securing of the rear section to the front section is effected advantageously by the provision of an outer thread on one of the sections and an inner thread on the other section, so that the two sections can be screwed axially so as to be flush with one another.

As an alternative to this, it is also readily possible for the mutual connection of the two sections to be effected in another manner, such as by way of a threaded sleeve into which the front and rear sections can be screwed from mutually-opposed sides.

Advantageously, the spindle nut and the axial bearing are arranged in a cavity of the front or rear section, which extends from the end of one section in the axial direction into the individual section concerned.

Advantageously, the first longitudinal element is designed in the form of a piston rod and the second longitudinal element is designed in the form of a cylinder, in which the piston rod is guided in a longitudinally displaceable manner.

BRIEF DESCRIPTION OF THE DRAWINGS

The invention is explained in greater detail hereinafter by way of an example, based on the drawings. These show:

FIG. 1: A longitudinal section through a first embodiment of the intermediate piece according to the invention, which allows for a longitudinal extension, but is blocked in the shortening direction, FIG. 2: The intermediate piece from FIG. 1 in an extended position.

DETAILED DESCRIPTION OF THE INVENTION

Figure 3:
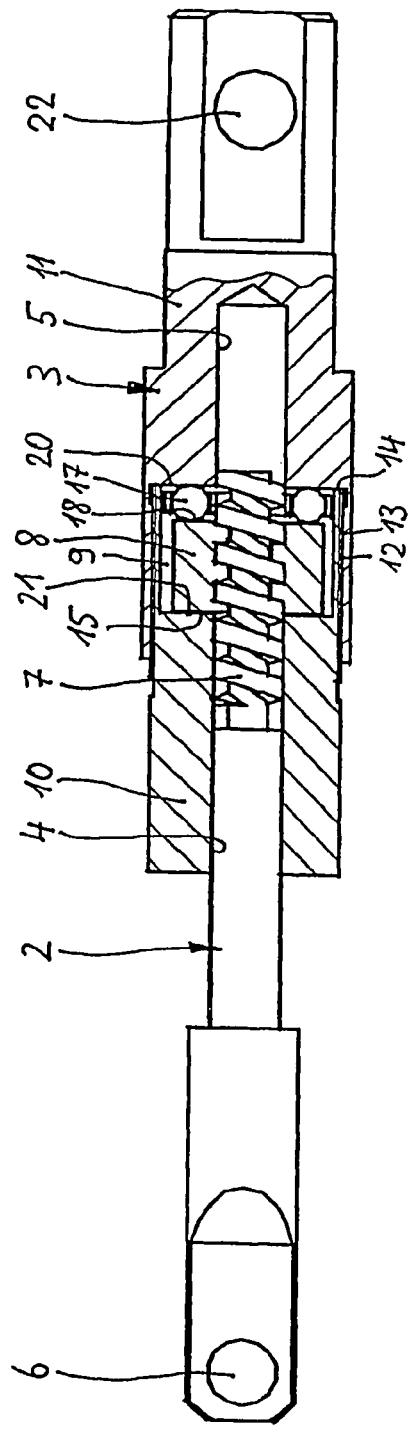
FIG. 3: A longitudinal section through a second embodiment of the intermediate piece according to the invention, which can be shortened by being pushed together but is blocked in the pulling out direction.

In FIG. 1 a longitudinally adjustable intermediate piece 1 can be seen, which comprises a first longitudinal element 2 and a second longitudinal element 3, which are arranged so as to be flush in an axial direction. In this situation, the first longitudinal element 2 is designed as a rod, which is introduced in the manner of a piston rod over a part of its length into axially flush cylinder holes 4, 5 of the second longitudinal element 3 and can be guided in a longitudinally displaceable manner in this.

At the outer end in each case, the longitudinal elements 2, 3, as shown, may have securing aids, for example in the form of transverse holes 6, 22, or pins, threads, etc. Such securing aids can be of the most widely differing types, and depend on with which parts, not shown, the outer ends of the longitudinal elements 2, 3 interact.

At the opposite end, arranged inside the second longitudinal element 3, the first longitudinal element 2 has a threaded section with a thread 7. This thread 7 interacts with a spindle nut 8, which is arranged so as to be capable of rotation but not of axial displacement in a cavity 9 of the second longitudinal element 3.

In order to be able to arrange the spindle nut 8 inside the second longitudinal element 3, the second longitudinal element 3 is divided into two parts and consists of an essentially cylindrical front section 10, as well as an essentially cylindrical rear section 11. The cavity 9, which accommodates the spindle nut 8, is formed by a correspondingly dimensioned axial hole at the rear end of the front section 10. The cylinder hole 4 is located in the front section 10, while the cylinder hole 5, which has at least essentially the same diameter as the cylinder hole 4, is located in the rear section 11.

The rear section 11 is screwed onto the front section 10 so as to be axially flush. To achieve this, the rear section 11 has in its front end area a correspondingly large dimensioned axial hole with an internal thread 12, into which the rear end area of the front section 10, which carries a corresponding outer thread 13, can be screwed, until the rear face 14 of the front section 10 comes in contact with the bottom of the axial hole. As an alternative, the front section 10 could also be screwed onto the rear section 11.

As can be seen, an axial bearing 17 is located between the front face 15 of the spindle nut 8 and the base surface 16 of the cavity 9, on which the spindle nut 8 is axially supported. The axial bearing 17 in the present embodiment is designed as an axial ball bearing but may also consist of other types of bearings which have a low rolling or sliding resistance. By contrast, with its opposite rear face 18 the spindle nut 8 is directly in contact with a friction surface 19 of the rear section 11 of the second longitudinal element 3, wherein this friction surface 19 is formed by the base of the axial hole, and therefore runs parallel to the rear surface 18 of the spindle nut 8. The spindle nut 8 can, as a result, come in contact over a large area with the friction surface 19, as a result of which a large friction resistance is brought about when the spindle nut 8 is pressed by the axial thrust of the thread 7 against the friction surface 19, i.e. to the right in FIGS. 1 and 2.

If, by contrast, the spindle nut 8 is pushed or pulled by means of the thread 7 in the opposed axial direction, i.e. to the left, then the friction resistance between the spindle nut 8 and the front section 10 is substantially lower because of the axial bearing 17. The two longitudinal elements 2, 3 can therefore already be pulled apart with a low amount of force, wherein the spindle nut 8 is displaced by rotation via the thread 7. The form and pitch of the thread 7 are formed in such a way that no self-locking occurs between the thread 7 and the spindle nut 8.

FIG. 2 shows the longitudinally adjustable intermediate piece 1 in a position pulled further apart in comparison with FIG. 1. It is not possible for the two longitudinal elements 2, 3, to be pushed together from a position once adopted, for example from the position shown in FIG. 2. Specifically, if an axial compressive force is applied to the two longitudinal elements 2, 3, from opposed sides, the friction resistance between the spindle nut 8 and the second longitudinal element 3 is increased in the area of the friction surface 19 in such a way that a rotation of the spindle nut 8 is blocked.

The intermediate piece 1 represented in FIGS. 1 and 2 can therefore, on the one hand, already be pulled apart steplessly with a small amount of force, i.e. extended, and, on the other hand, guarantee in every position an immediate locking into the opposite direction, i.e. in the shortening direction.

Figure 4:
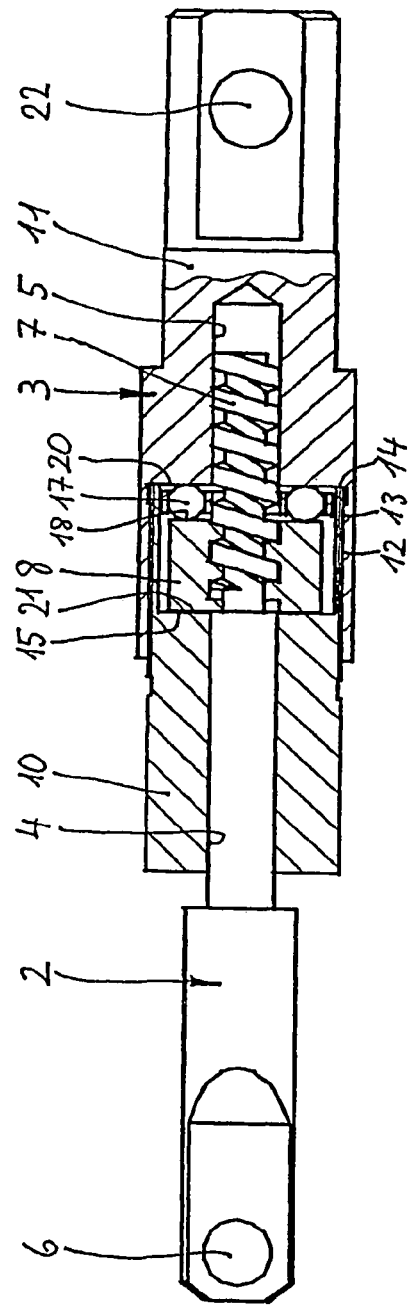
FIG. 4: The intermediate piece from FIG. 3 in a shortened position.

Shown in FIGS. 3 and 4 is a second embodiment of the intermediate piece 1 according to the invention, which is formed in quite a similar manner to the first embodiment but takes effect in the opposite direction. This second embodiment can be pushed together from a position with maximum length, which is represented in FIG. 3, steplessly and with a low amount of force, while the pulling apart of the two longitudinal elements 2, 3, is blocked in every position. In FIGS. 3 and 4, parts which are the same or similar to the first embodiment are provided with the same reference numbers The only difference between the second and first embodiments lies in the fact that, in the second embodiment, as can be seen from FIGS. 3 and 4, the location of the axial bearing 17 is mirror-imaged in respect of the spindle nut 8, ie the axial bearing 17 is arranged between the spindle nut 8 and a base surface 20 of the second longitudinal element 3, while the spindle nut 8 with its front face 15 is in direct contact with a friction surface 21 of the first longitudinal element 2 parallel thereto, over a large surface area. The base surface 20 of the second embodiment in this case corresponds to the friction surface 19 of the first embodiment. The friction surface 21 of the second embodiment corresponds to the base surface 16 of the first embodiment.

If an axial compressive force is applied to the longitudinal elements 2, 3 from the second embodiment in the pulling apart position, i.e. the two longitudinal elements 2, 3 are pushed together, the thread 7 exerts a rotation of the spindle nut 8, which, because of the reduced friction resistance caused by the axial bearing 17 between the spindle nut 8 and the second longitudinal element 3, is already possible at low compressive forces. The first longitudinal element 2 can, therefore, be pushed steplessly into the second longitudinal element 3.

Conversely, the high friction resistance between the spindle nut 8 and the second longitudinal element 3 in the area of the friction surface 21 has the effect that the spindle nut 8 can no longer rotate when the longitudinal elements are pulled apart and any pulling apart is therefore prevented.

According to the invention, a longitudinally adjustable intermediate piece is provided which can also be designated as a self-anchoring longitudinally adjustable and subsequently adjustable device and can be used in the most widely differing sectors of technology. Areas of application are, for example: Resetting devices in a simplex drum brake or a servo-assisted brake, as a setting or resetting device for compression or extraction pistons, handbrake levers, transmission linkages, Bowden cables and many more besides.

The invention claimed is:

1. A longitudinally adjustable intermediate piece with a unidirectionally acting displacement blocking mechanism, comprising:
   a first longitudinal element, provided with a thread;
   a second longitudinal element which interacts with the first longitudinal element in a longitudinally displaceable manner; and
   a spindle nut retained in the second longitudinal element in a rotatable and axially nondisplaceable manner relative to the second longitudinal element, the spindle nut interacting with the thread of the first longitudinal element,
   wherein the spindle nut rests via one of its two faces on a friction surface of the second longitudinal element while covering a large area or can be brought into contact therewith, if an axial compressive force takes effect on the first and second longitudinal elements, while between the other face of the spindle nut two faces and the second longitudinal element a friction-reducing axial bearing is provided, so that, when an axial tractive force is applied to the first and second longitudinal elements, the spindle nut can be rotated by the axial tractive force via the thread and the first and second longitudinal elements can be pulled apart, while, on application of an axial compressive force onto the first and second longitudinal elements, the rotation of the spindle nut is blocked by friction resistance between the spindle nut and the friction surface, thereby preventing the first and second longitudinal elements from being pushed together.

2. A longitudinally adjustable intermediate piece with a unidirectionally acting displacement blocking mechanism, comprising:
   a first longitudinal element, provided with a thread;
   a second longitudinal element which interacts with the first longitudinal element in a longitudinally displaceable manner; and
   a spindle nut retained in the second longitudinal element in a rotatable and axially nondisplaceable manner relative to the second longitudinal element, the spindle nut interacting with the thread of the first longitudinal element,
   wherein the spindle nut rests via one of its two faces on a friction surface of the second longitudinal element while covering a large area or can be brought into contact therewith, if an axial tractive force takes effect on the first and second longitudinal elements, while between the other face of the spindle nut two faces and the second longitudinal element a friction-reducing axial bearing is provided, so that, when an axial compressive force is applied to the first and second longitudinal elements, the spindle nut can be rotated by the axial compressive force via the thread and the first and second longitudinal elements can be pushed together, while, on application of an axial tractive force to the first and second longitudinal elements, the rotation of the spindle nut is blocked by friction resistance between the spindle nut and the friction surface, thereby preventing the first and second longitudinal elements from being pulled apart.

3. The intermediate piece as claimed in claim 1, wherein at least one of the friction surface of the second longitudinal element and the face of the spindle nut adjacent to the friction surface is provided with a friction-increasing surface.

4. The intermediate piece as claimed in claim 1, wherein the second longitudinal element is divided into two parts and comprises a front section and a rear section, which can be secured to be axially flush with one another, in which the friction surface is formed in the rear section, while the axial bearing is arranged between the spindle nut and the front section.

5. The intermediate piece as claimed in claim 1, wherein the second longitudinal element is divided into two parts and comprises a front section and a rear section, which can be secured to be axially flush with one another, in which the friction surface is formed in the front section, while the axial bearing is arranged between the spindle nut and the rear section.

6. The intermediate piece as claimed in claim 4, wherein the spindle nut and the axial bearing are arranged in a cavity of the front or rear section.

7. The intermediate piece as claimed in claim 1, wherein the first longitudinal element is designed in the form of a piston rod and the second longitudinal element is designed in the form of a cylinder, in which the first longitudinal element is guided in a longitudinally displaceable manner.

8. The intermediate piece as claimed in claim 2, wherein at least one of the friction surface of the second longitudinal element and the face of the spindle nut adjacent to the friction surface is provided with a friction-increasing surface.

9. The intermediate piece as claimed in claim 2, wherein the second longitudinal element is divided into two parts and comprises a front section and a rear section, which can be secured to be axially flush with one another, in which the friction surface is formed in the rear section, while the axial bearing is arranged between the spindle nut and the front section.

10. The intermediate piece as claimed in claim 2, wherein the second longitudinal element is divided into two parts and comprises a front section and a rear section, which can be secured to be axially flush with one another, in which the friction surface is formed in the front section, while the axial bearing is arranged between the spindle nut and the rear section.

11. The intermediate piece as claimed in claim 5, wherein the spindle nut and the axial bearing are arranged in a cavity of the front or rear section.

12. The intermediate piece as claimed in claim 10, wherein the spindle nut and the axial bearing are arranged in a cavity of the front or rear section.

13. The intermediate piece as claimed in claim 2, wherein the first longitudinal element is designed in the form of a piston rod and the second longitudinal element is designed in the form of a cylinder, in which the first longitudinal element is guided in a longitudinally displaceable manner.

14. A longitudinally adjustable intermediate piece with a unidirectionally acting displacement blocking mechanism, comprising:
   a first longitudinal element, provided with a thread;
   a second longitudinal element which interacts with the first longitudinal element in a longitudinally displaceable manner, the second longitudinal element including a spindle nut cavity;
   a spindle nut disposed in the spindle nut cavity, the spindle nut cavity being sized and positioned to prevent the spindle nut from being axially displaced relative to the second longitudinal element; and a friction-reducing axial bearing disposed in engagement with one side of the spindle nut in the spindle nut cavity, wherein an opposite side of the spindle nut engages a friction surface of the second longitudinal element, wherein the first and second longitudinal elements, the spindle nut and the friction-reducing axial bearing are constructed such that longitudinal displacement of the first longitudinal element relative to the second longitudinal element is only effected by rotation of the spindle nut resulting from one of an axial tractive force and an axial compressive force applied to the longitudinal elements depending on which side of the spindle nut is engaged with the friction-reducing axial bearing.

\* \* \* \* \*